United States Patent Office 3,350,448
Patented Oct. 31, 1967

3,350,448
PROCESS FOR FLUORINATING BIGUANIDE
Clare Kucera, Tulsa, Okla., and William J. Leahy and Claude E. Merrill, Lancaster, Calif., assignors to The Dow Chemical Company, Midland, Mich., a corporation of Delaware
No Drawing. Filed June 25, 1964, Ser. No. 379,437
6 Claims. (Cl. 260—564)

ABSTRACT OF THE DISCLOSURE

The present invention is a novel process for fluorinating a metal complex of biguanide by mixing an alkali metal fluoride, alkaline earth metal fluoride or mixture of these fluorides with a metal complex of biguanide. The resulting mixture is agitated while being maintained at a temperature of from about minus 80° C. to about 5° C. while fluorine is passed through the agitated solid mass over a period of from about 0.5 to about 6 hours or more.

This invention relates to a process for fluorinating nitrogen containing organic materials and more particularly is concerned with a process for fluorinating a biguanide source material to provide fluorinated biguanide, -guanidine and -amine products suitable for use as oxidizers in high energy propellant systems.

The preparation of N,N - [bis(difluoroamino)fluoromethyl]fluoroamine, hereinafter designated as $F_{11}BG$, and 1-[bis(difluoroamino)fluoromethyl]-1,2,3,3-tetrafluoroguanidine, hereinafter designated as $F_9BG$, for example, has been achieved by direct fluorination of biguanide sulfate in the presence of sodium fluoride. Perfluorobiguanide, hereinafter designated as $F_7BG$, has been prepared by fluorinating an aqueous buffered solution of biguanide. In both of these processes, however, very low product yields are achieved.

Now unexpectedly, it has been found that markedly improved yields of these fluorinated nitrogen containing organic products are realized by direct fluorination of a biguanide complex feed stock.

In accordance with the present novel process, a metal complex of biguanide is mixed with an alkali metal fluoride, alkaline earth metal fluoride or mixture of these fluorides. Sodium fluoride is particularly suitable. The resulting mixture is agitated while being maintained at a temperature of from about minus 80° C. to about 5° C. and preferably at from about 80° C. to about minus 75° C.

Fluorine, preferably diluted with an inert gas such as nitrogen argon and the like, is passed through the agitated solid mass for a period of from about 0.5 to about 6 hours or more while maintaining the reaction temperature within the range designated hereinbefore.

At the higher temperatures, the resulting fluorinated products pass directly from the reaction zone being swept therefrom by the fluorine-inert gas mixture and are collected. At the lower operating temperatures, the products substantially all remain in the reactor. Subsequent to the reaction the temperature can be raised to about 0° C., for example, and the resulting vaporized products transferred to a receiver or collector.

Conveniently, the product materials are collected in a cold condenser, gas collector or the like receiver and the fluorinated products recovered by fractional distillation, chromatographic techniques or other separation and recovery procedures.

Product yields markedly increased over that obtained by processes practiced heretofore are obtained over the entire temperature range with particularly high yields resulting at the extremely low temperature range.

Generally the weight proportions of metal fluoride/biguanide metal complex range from about 1/1 to about 50/1 or more, a weight ratio of from about 10 to about 30 being preferred.

Fluorine-inert gas mixtures ranging by volume percent from about 5 percent fluorine-95 percent inert gas to about 50 percent fluorine-50 percent inert gas usually are employed. Preferably, mixtures containing from about 67 to about 85 percent nitrogen and 33 to about 15 percent fluorine are utilized.

The actual ratio of fluorine and complex biguanide feed stock material to be employed is not critical except for optimum product yield fluorine in excess of that stoichiometrically required for preparation of the fluorinated product is used. Ordinarily the volume of fluorine flow rates (expressed as total gas flow of fluorine plus inert gas in cubic centimeters per minute) to weight of the metal biguanide complex (grams) ratio of about 50 to 500 and preferably about 100–300 are employed. Any excess fluorine that is not reacted can be recovered from the fluorinated product and can be recycled for subsequent reaction. Ordinarily, the product materials and any excess fluorine and nitrogen are passed into a cold trap receiver, the fluorinated products condensing therein. The fluorine and nitrogen pass through the trap.

The present process can be carried out either in batch type, cyclic batch type, or continuous operations. Reactors and processing equipment to be employed are fabricated from those materials which are not detrimentally affected by the reactants or product materials and which have the requisite physical strength and desired structural characteristics as is understood by one skilled in the art. Stainless steel, nickel, nickel alloys and the like all are suitable materials of construction.

Any metal complex of biguanide can be employed as the biguanide feed stock. Cobalt(III) biguanide complex, and copper(II) biguanide complex are particularly suitable; nickel(II) biguanide complex also has been used. The preparation of the metal biguanide complex reactants can be carried out in accordance with the teachings set forth by P. Ray "Complex Compounds of Biguanides and Guanylureas with Metallic Elements," Chem. Rev. 313, 1961.

The following examples will serve to further illustrate the present invention but are not meant to limit it thereto.

Example 1

A solution of about 5 grams biguanide and about 1 gram sodium hydroxide in about 200 cubic centimeters water was added slowly over a period of about one hour to an agitated solution of about 4 grams cobalt(II) chloride hexahydrate in about 100 cubic centimeters of water. During the addition, a stream of air was passed through the cobalt chloride solution to oxidize the cobalt to Co(III). After 5–6 hours, the solution became a deep violet color and cobalt(III) biguanide complex precipitated therein. The solid complex was removed by filtration and recrystallized from hot water. The resulting wine-red colored long needles were dried at room temperature at a low absolute pressure in a desiccator over sodium hydroxide pellets.

About 3 grams of the cobalt(III) biguanide and about 30 grams of dry sodium fluoride were intimately mixed in a substantially anhydrous atmosphere and placed in a 1 liter, 3-necked, Monel metal flask. After loading with the dry mix, the reaction vessel was immersed in a water-glycol bath and maintained at about 0° C. while nitrogen diluted elemental fluorine (~33 percent by volume fluorine) was passed through the slowly stirred solid mixture at a total gas flow rate of about 300 cubic centimeters per minute for about three hours. The reaction products were condensed in a cold trap maintained at about minus 78°

C. and purified by vapor phase chromatography. Product yield of $F_{11}BG$ was found to be about 250 milligrams; about 150 milligrams of $F_9BG$ also were produced.

In a second run about 1 gram of cobalt(III) biguanide and about 30 grams of sodium fluoride were added to the 1-liter Monel flask and cooled to about minus 78° C. by placing the flask containing the mix in a bath of Dry Ice and methanol chloride. A gas mixture of about 2 parts by volume nitrogen and 1 part by volume fluorine at a total flow rate of about 300 cubic centimeters per minute was passed over the solid mixture while it was being agitated. After fluorinating for about five hours, the reactor was warmed and the fluorinated product collected in a liquid oxygen trap. Purification and separation of the product mixture by vapor phase chromatography indicated $F_{11}BG$ in about 0.28 gram yield and $F_9BG$ in about 0.34 gram yield. This indicated a combined $F_{11}BG$ and $F_9BG$ produce yield of about 25 percent.

*Example 2*

About 50 cubic centimeters of concentrated ammonium hydroxide solution (~28% $NH_3$) was added as a single portion to a solution of about 8 grams of anhydrous copper(II) sulfate in about 200 cubic centimeters of water to form the copper-ammonia complex $Cu(II)(NH_3)_4SO_4$. This solution was added dropwise with stirring to a second solution containing about 10 grams biguanide and 0.4 gram sodium hydroxide dissolved in about 1000 cubic centimeters of water. As the copper ammonia complex was added to the biguanide solution its color faded and copper biguanide sulfate complex precipitated as pink platelets. Following the completion of the addition, the precipitated platelets were separated from the residual liquid by filtration, washed with 1 N sodium hydroxide solution, water washed and dried at 110° C. for 18 hours. As residual water was removed from the complex upon drying, the color of the complex changed from pink to a light rust red color. The complex melted above 200° C. with decomposition.

About 5 grams of the copper biguanide complex, about 5 grams of sodium fluoride and about 100 cubic centimeters of cracked ice were placed in the one-liter Monel flask and this immersed in a low temperature bath maintained at from about minus 25 to about minus 30° C. The mixture was agitated while a gaseous mixture of about 5 percent by volume fluorine-95 percent by volume nitrogen was passed therethrough at a total flow rate of about 400 cubic centimeters per minute for about 5 hours. The gaseous products were collected in a U-trap at about minus 70° C. and purified by chromatographic techniques.

$F_7BG$ was found to be the main fluorinated product, being produced in about 3 percent yield with nitrogen tetraoxide ($N_2O_4$) and tris(difluoroamine) fluoromethane being the principal by-products.

In a second run about 35 grams of sodium fluoride, about 15 grams of magnesium fluoride, about 5 grams of copper biguanide complex and about 10 grams of ice were placed in the one-liter Monel metal flask and the reactor flask then immersed in the low temperature bath maintained at from about minus 25° to about minus 30° C. The solid mixture was agitated while a gaseous nitrogen-fluorine mixture at a $N_2/F_2$ volume ratio of about 4 was passed through the reactor for a total period of about 2 hours at a flow rate of about 400 cubic centimeters per minute. The reaction products were swept from the reactor by the unreacted fluorine-nitrogen gas mixture, and passed through a drying columns (Drierite and substantially anhydrous sodium fluoride pellets) prior to being condensed and collected in a cold trap maintained at about minus 100° C. Recovery and separation of the product components by chromatographic techniques indicated a yield of $F_7BG$ of about 6 percent. Unreacted guanide complex reactant and tris(difluoroamino) fluoromethane also was found to be present as well as trace amounts of $F_9BG$ and $F_{11}BG$.

In a manner similar to that described for the foregoing examples, nickel biguanide complex and other metal complexes can be employed in the present novel process and fluorinated in the presence of alkali metal or alkaline earth metal fluoride, e.g., potassium fluoride, calcium fluoride, rubidium fluoride or cesium fluoride in accordance with this invention.

Various modifications can be made in the present invention without departing from the spirit or scope thereof for it is understood that we limit ourselves only as defined in the appended claims.

We claim:
1. A process for fluorinating biguanide which comprises:
    (a) providing a mixture of a metal complex of biguanide and a member selected from the group consisting essentially of alkali metal fluorides, alkaline earth metal fluorides and mixtures thereof,
    (b) agitating said mixture,
    (c) contacting the agitated mixture with fluorine while maintaining the reaction temperature at from about minus 80° C. to about 5° C., and
    (d) recovering fluorinated products produced by reaction of said metal biguanide complex with said fluorine.
2. A process for fluorinating biguanide which comprises:
    (a) providing a mixture of a metal complex of biguanide and a member selected from the group consisting essentially of alkali metal fluorides, alkaline earth metal fluorides and mixtures thereof, said metal complex of biguanide being selected from the group consisting of cobalt(III) biguanide and copper(II) biguanide, the weight proportions of said alkali metal fluoride/metal biguanide complex ranging from about 1/1 to about 50/1,
    (b) agitating said mixture,
    (c) contacting the agitated mixture of the metal fluoride and metal biguanide complex with fluorine for a period of time of from about 0.5 to about 6 hours while maintaining the reaction temperature at from about minus 80° C. to about 5° C., said fluorine being in admixture with an inert gas so as to provide a fluorine-inert gas mixture containing from about 5 to about 50 percent by volume fluorine and 95 to about 50 percent by volume of said inert gas, the volume of said gas mixture flow rate to weight of said metal biguanide complex ranging from about 50 to about 500, and
    (d) recovering the fluorinated products produced by reaction of said metal biguanide complex with said fluorine.
3. The process as defined in claim 2 wherein the metal fluoride is sodium fluoride.
4. A process for preparing N,N-[bis(difluoroamine) fluoromethyl]fluoramine and 1-[bis(difluoroamine)fluoromethyl]-1,2,3,3-tetrafluoroguanidine which comprises:
    (a) providing a mixture of sodium fluoride and cobalt (III) biguanide complex, the weight ratio of said sodium fluoride and said cobalt(III) biguanide complex ranging from about 10 to about 30,
    (b) agitating said mixture,
    (c) contacting the agitated mixture of said sodium fluoride and said cobalt(III) biguanide complex with fluorine for a period of from about 3 to about 5 hours while maintaining the reaction temperature at from about minus 80° to about 0° C., said fluorine being in admixture with nitrogen so as to provide a fluorine-nitrogen gas mixture containing about 33 volume percent fluorine and about 67 volume percent nitrogen, the volume flow rate of said gas mixture, expressed as cubic centimeters per minute, to weight of said cobalt(III) biguanide complex, expressed as grams, ranging from about 100 to about 300,

(d) transferring the reaction products to a receiver maintained at a maximum temperature of about minus 70° C. thereby to condense fluorinated organic reaction products in said receiver, and (e) recovering N,N-[bis(difluoroamino)fluoromethyl] fluoramine and 1-[bis(difluoroamino)fluoromethyl]-1,2,3,3-tetrafluoroguanidine therefrom.

5. The process as defined in claim 4 wherein the agitated mixture of said sodium fluoride and said cobalt(III) biguanide complex is contacted with fluorine at a temperature of from about minus 80 to about minus 70° C.

6. A process for preparing perfluorobiguanide which comprises:

(a) providing a mixture comprising copper(II) biguanide complex, sodium fluoride and magnesium fluoride the weight ratio of said sodium fluoride and magnesium fluoride to said copper(II) biguanide complex ranging from about 1 to about 7, (b) agitating said mixture, (c) contacting the agitated mixture of said metal fluorides and said copper(II) biguanide complex with fluorine for a period of from about 2 to about 5 hours while maintaining the reaction temperature at from about minus 30 to about minus 25° C., said fluorine being in admixture with nitrogen so as to provide a fluorine-nitrogen gas mixture containing from about 5 to about 20 volume percent fluorine and 95 to about 80 volume percent nitrogen, the volume flow rate of said gas mixture, expressed as cubic centimeters per minute, to weight of said copper(II) biguanide complex, expressed as grams being about 80, (d) transferring the reaction products to a receiver maintained at a maximum temperature of about minus 70° C. thereby to condense the fluorinated organic reaction products in said receiver, and (e) recovering perfluorobiguanide therefrom.

References Cited

UNITED STATES PATENTS 2,945,061  7/1960  Habernickel _____ 260—694 XR

OTHER REFERENCES

Attaway et al.: J. Am. Chem. Soc., vol. 81, pp. 3599 to 3603 (1959).

Lawton et al.: J. Am. Chem. Soc., vol. 81, p. 4755 (1959).

CHARLES B. PARKER, *Primary Examiner.*

REUBEN EPSTEIN, *Examiner.*

L. A. SEBASTIAN, BERNARD BILLIAN,
*Assistant Examiners.*